(12) United States Patent
Thomas et al.

(10) Patent No.: US 7,448,648 B2
(45) Date of Patent: Nov. 11, 2008

(54) AIR BAG SYSTEM

(75) Inventors: Scott D. Thomas, Novi, MI (US); James M. Kumkoski, Utica, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 323 days.

(21) Appl. No.: 11/360,638

(22) Filed: Feb. 23, 2006

(65) Prior Publication Data

US 2006/0290119 A1 Dec. 28, 2006

Related U.S. Application Data

(63) Continuation-in-part of application No. 11/166,747, filed on Jun. 24, 2005.

(51) Int. Cl.
 *B60R 21/16* (2006.01)
(52) U.S. Cl. .................................... 280/743.2
(58) Field of Classification Search .............. 280/743.2, 280/728.3, 739
 See application file for complete search history.

(56) References Cited

U.S. PATENT DOCUMENTS

| | | | | |
|---|---|---|---|---|
| 5,388,860 A * | 2/1995 | Brede et al. | ................. | 280/739 |
| 5,762,367 A * | 6/1998 | Wolanin | ....................... | 280/736 |
| 6,082,765 A | 7/2000 | Bowers et al. | ............... | 280/742 |
| 6,206,408 B1 * | 3/2001 | Schneider | ................. | 280/728.1 |
| 6,945,559 B2 * | 9/2005 | Kassman et al. | ............. | 280/735 |
| 7,275,761 B2 * | 10/2007 | Gould et al. | ................. | 280/742 |
| 2004/0051285 A1 | 3/2004 | Fischer | | |
| 2004/0051286 A1 | 3/2004 | Fischer et al. | | |
| 2004/0164531 A1 * | 8/2004 | Riha et al. | ................... | 280/732 |
| 2004/0232677 A1 | 11/2004 | Fischer et al. | | |
| 2005/0040634 A1 | 2/2005 | Braun et al. | | |
| 2005/0127648 A1 | 6/2005 | Fischer et al. | | |
| 2005/0146122 A1 | 7/2005 | Goud et al. | | |
| 2006/0192370 A1 * | 8/2006 | Abe et al. | ................... | 280/735 |

FOREIGN PATENT DOCUMENTS

| | | |
|---|---|---|
| DE | 10339031 A1 | 3/2004 |
| DE | 102004027703 A1 | 4/2005 |
| DE | 10124273 A1 | 2/2006 |
| EP | 1338480 A2 | 8/2003 |
| JP | 2001260799 A1 | 9/2001 |
| WO | 0158726 A1 | 2/2006 |

* cited by examiner

*Primary Examiner*—Faye M. Fleming

(57) ABSTRACT

An air bag system housed within a cavity includes an inflator, an inflatable air bag, and an air bag housing defining a vent. A deployment door movable between a closed position and an open position at least partially covers the cavity. A vent restrictor is movable between a first position and a second position. In one of the first and second positions, the vent restrictor at least partially blocks the vent to restrict venting of inflation fluid therethrough. In the other of the positions, the vent restrictor leaves the vent substantially open. The vent restrictor is operatively connected to the deployment door or the air bag. When connected to the deployment door, movement of the deployment door from the closed position to the open position moves the vent restrictor. When connected to the air bag, inflation of the air bag moves the vent restrictor.

20 Claims, 3 Drawing Sheets

AIR BAG SYSTEM

RELATED APPLICATIONS

This application is a continuation-in-part of U.S. patent application Ser. No. 11/166,747 filed on Jun. 24, 2005.

TECHNICAL FIELD

This invention relates to an automotive vehicle air bag system, and more particularly to a vent restrictor for selectively restricting inflation fluid flow through a vent within an air bag housing.

BACKGROUND OF THE INVENTION

Air bag systems in automotive vehicles generally include an air bag that is designed to deploy within a passenger compartment of the automotive vehicle when triggered by a sensor signal. For example, air bag systems might be deployed upon sudden deceleration of a vehicle or upon impact of the vehicle with another object. The art continues to investigate alternative ways to deploy air bags. For example, accelerometers have been investigated to determine when a sensor signal should signal the deployment of an air bag. Inflator assemblies have been developed to control how much gas is emitted into an air bag upon deployment.

SUMMARY OF THE INVENTION

An air bag system housed within a cavity in a vehicle includes an inflator, an inflatable air bag inflatable upon release of inflation fluid by the inflator, and an air bag housing substantially surrounding the air bag and defining a vent. A deployment door movable between a closed position and an open position at least partially covers the cavity. A vent restrictor is movable between a first position and a second position. In one of the first and second positions, the vent restrictor at least partially blocks the vent to restrict venting of inflation fluid therethrough. In the other of the positions, the vent restrictor leaves the vent substantially open. The vent restrictor is operatively connected to either the deployment door or the air bag itself. When connected to the deployment door, movement of the deployment door from the closed position to the open position moves the vent restrictor from the first position to the second position. When connected to the air bag, inflation of the air bag moves the vent restrictor from the first position to the second position.

In one aspect of the invention, the air bag system further includes a tether extending between the vent restrictor and either the deployment door or the air bag. In another aspect of the invention, at least a portion of the vent restrictor is integral with the deployment door. The vent restrictor may translate or rotate from the first position to the second position, and may include a counterbalancing portion. The air bag system may further include a first retention feature to keep the vent restrictor in the first position, a second retention feature to keep the vent restrictor in the second position, and/or a travel stop, with the vent restrictor being movable until contacting the travel stop.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
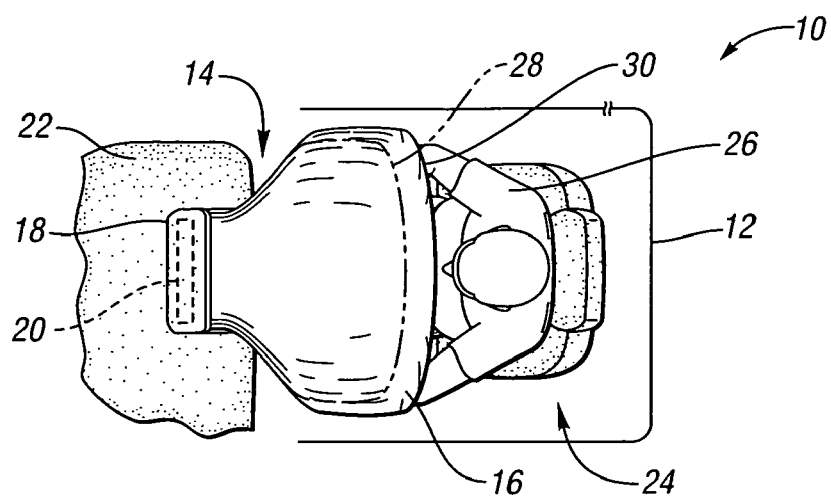
FIG. 1 is a schematic plan view illustration of an air bag system mounted to a vehicle.

Referring to the drawings, wherein like reference numbers refer to like components, FIG. 1 shows a vehicle 10 having a vehicle body 12. An air bag system 14 is mounted to the vehicle 10. The air bag system 14 includes an air bag 16 connected to an air bag housing 18. An inflator 20 is mounted within the housing 18. The housing 18 is mounted within an instrument panel 22, although it may be mounted elsewhere on the vehicle 10 within the scope of the invention. The air bag 16 is selectively deployable into an interior space 24 toward an occupant 26 upon release of inflation gas by the inflator 20. The air bag 16 may be inflatable when deployed to either a shallow first profile 28 or a deeper second profile 30 as known in the art. Sensors (not shown) mounted to the vehicle 10 may be connected in signaling communication with the inflator 20, as known to those skilled in the art. Under certain sensed conditions, the sensors signal the inflator 20 to release inflation fluid, thereby inflating the air bag 16.

Figure 2A:
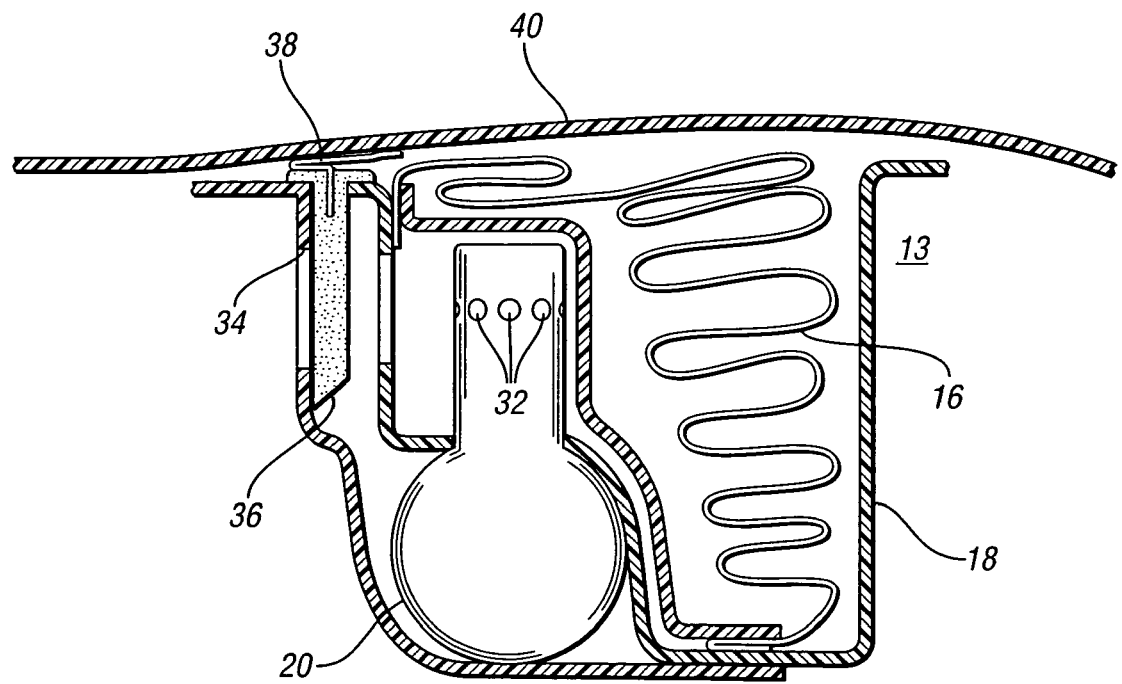
FIG. 2A is a schematic cross-sectional illustration of the air bag system of FIG. 1 showing a first embodiment of a vent restrictor in a first position and a deployment door in a closed position.
Figure 2B:
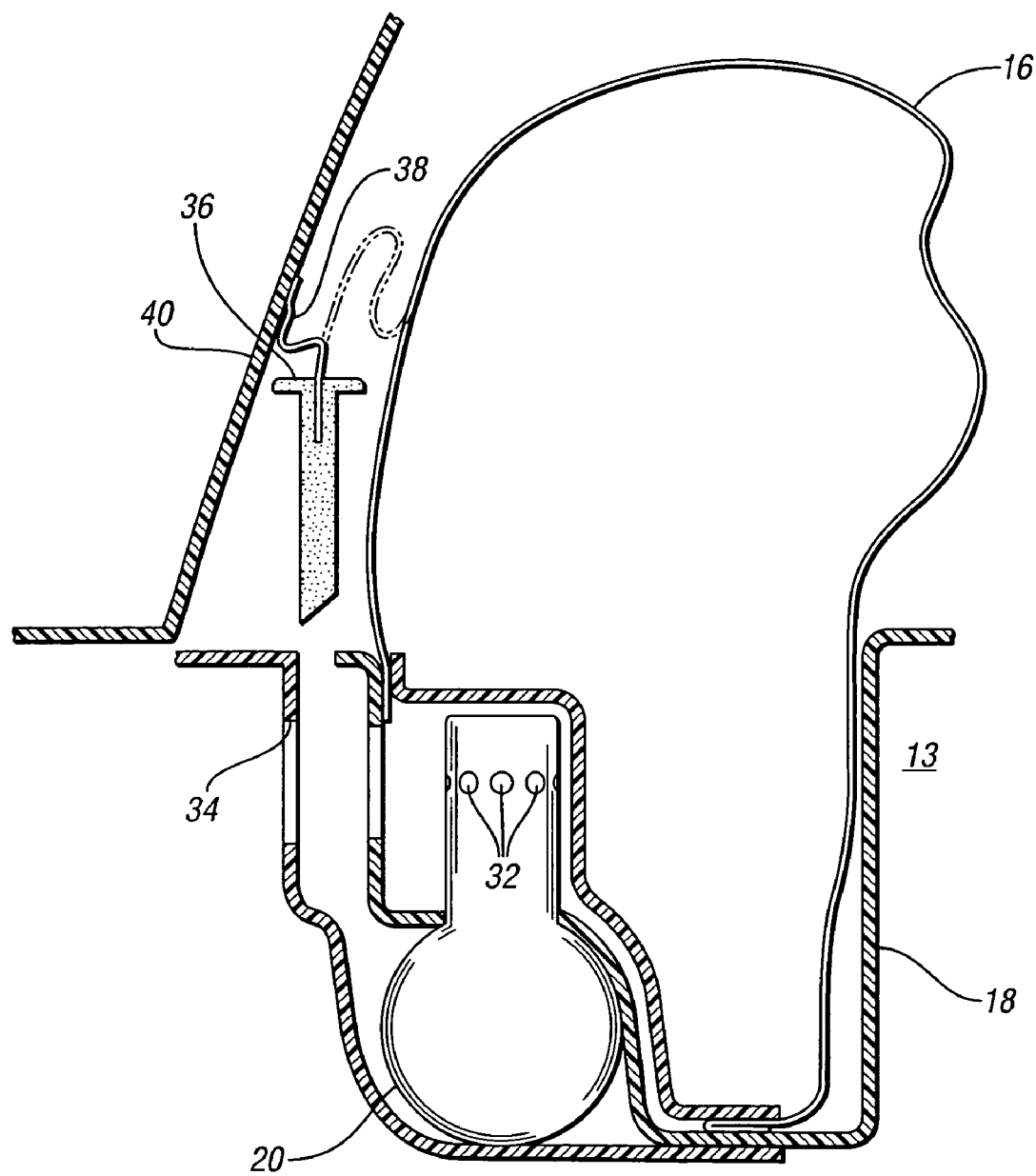
FIG. 2B is a schematic cross-sectional illustration of the air bag system of FIG. 1 showing the vent restrictor of FIG. 2A in a second position and the deployment door of FIG. 2A in an open position.
Figure 2C:
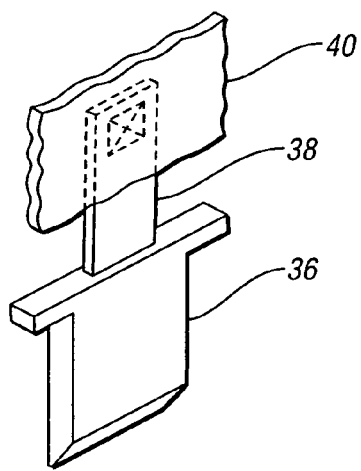
FIG. 2C is a schematic illustration of the vent restrictor of FIGS. 2A and 2B.

FIGS. 2A and 2B show a schematic cross-sectional view of the air bag system 14 of FIG. 1, with the air bag 16 housed within the housing 18 and in fluid communication with the inflator 20. The air bag system 14 is disposed within a cavity 13 as known in the art. The cavity 13 may, for example, be defined within a vehicle instrument panel, a steering wheel, a seat, a headliner, or a door. The inflator 20 releases inflation fluid from inflator ports 32, with a vent 34 within the housing 18 allowing the inflation fluid to pass into the surrounding atmosphere. A vent restrictor 36 selectively covers the vent 34 to prevent inflation fluid flow therethrough. The vent restrictor 36 is movable from a first position, shown in FIG. 2A, wherein the vent restrictor 36 at least partially covers the vent 34 to restrict inflation fluid therethrough, to a second position, shown in FIG. 2B, wherein the vent restrictor 36 leaves the vent 34 substantially open, thereby allowing substantial inflation fluid flow therethrough. While the vent restrictor 36 is shown inside of the housing 18 but outside of the air bag 16, the vent restrictor 36 may be disposed outside of the housing 18 or inside of the air bag 16 within the scope of the present invention. A possible design for the vent restrictor 36 is shown in FIG. 2C.

A deployment door 40 is movable between a closed position, shown in FIG. 2A, wherein the deployment door 40 substantially covers the cavity 13, and an open position, shown in FIG. 2B. The deployment door 40 prevents the vent restrictor 36 from contacting adjacent vehicle structure, such as a vehicle windshield, as the vent restrictor 36 travels to the second position and/or when the vent restrictor 36 is in the second position. A tether 38 extends between and operatively connects the vent restrictor 36 and the deployment door 40, such that movement of the deployment door 40 from the closed position to the open position moves the vent restrictor 36 from the first position to the second position. Alternatively, the tether 38 may extend between and operatively connect the vent restrictor 36 and the air bag 16, as shown in phantom in FIG. 2B, such that inflation of the air bag 16 moves the vent restrictor 36 from the first position to the second position.

Movement of the deployment door 40 to the open position can be triggered by sensors in response to signals indicating deployment of the air bag 16 is imminent, or movement may be mechanically induced when the air bag 16 hits the deployment door 40 during inflation. The deployment door 40 may rotatably or translatably attach to a portion of the housing 18, or a portion of other vehicle structure, and move from the closed position to the open position. Alternatively, the deployment door 40 may be designed to break away from the air bag system 14 or a portion of vehicle structure, either completely or partially, upon deployment of the air bag 16.

It should be noted that the vent restrictor 36 can leave the vent 34 substantially open when in the first position, and at least partially cover the vent 34 when in the second position, within the scope of the present invention. For example, the vent restrictor 36 shown in FIGS. 2A and 2B could define an opening (not shown) therethrough, which would align with the vent 34 when the vent restrictor 36 is in the first position, thereby allowing inflation fluid flow therethrough. Movement of the vent restrictor 36 to the second position would disalign the opening and the vent 34, such that the vent restrictor 36 substantially covered the vent 34 when in the second position. With such a design, the vent restrictor 36 would not be completely removed from within the housing 18 in the second position, as shown in FIG. 2B.

It should also be noted that the tether 38 need not be utilized to practice the present invention. For example, the vent restrictor 36 may directly attach to the deployment door 40. As another example, the vent restrictor 36 may be integrally formed with the deployment door 40, such that the vent restrictor 36 is essentially an extension of the deployment door 40. Additionally, a vent restrictor 36 according to the present invention may move from the first position to the second position in various ways, as described herein and otherwise contemplated. As an additional example, the vent restrictor 36 may translate from the first position to an intermediate position, and then rotate to the second position. It matters only that movement of the deployment door 40 from the closed position to the open position moves the vent restrictor 36 from the first position to the second position to practice the present invention.

Figure 3A:
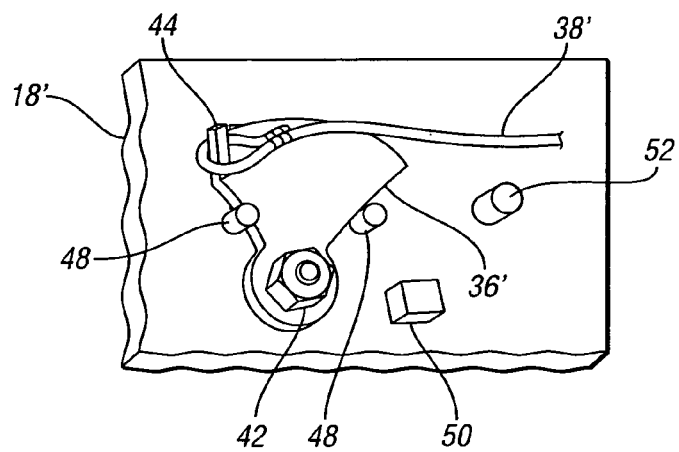
FIG. 3A is a schematic illustration of a second embodiment of a vent restrictor in a first position.
Figure 3B:
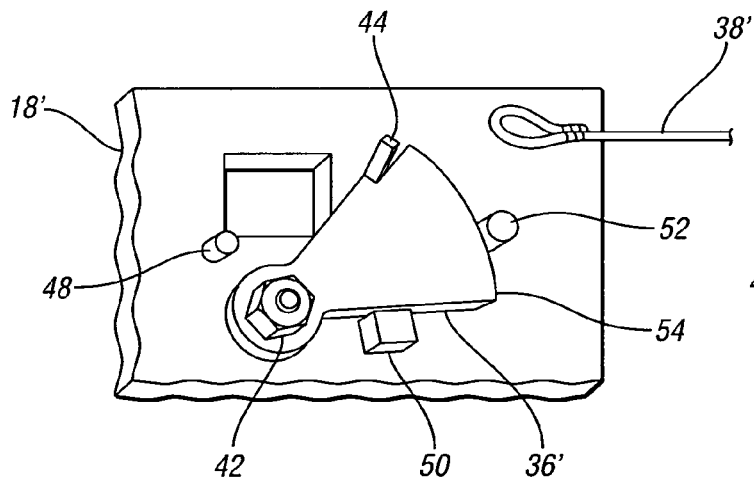
FIG. 3B is a schematic illustration of the vent restrictor of FIG. 3A in a second position.
Figure 3C:
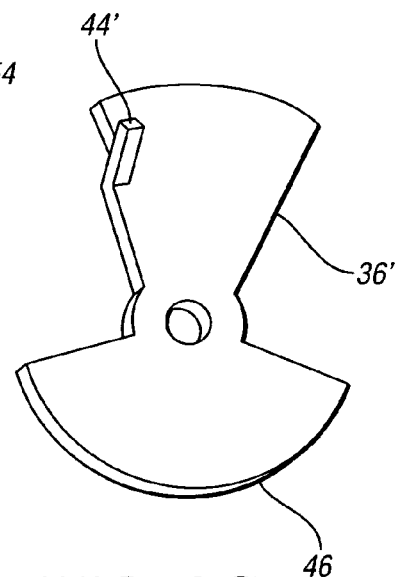
FIG. 3C is a schematic illustration of the vent restrictor of FIGS. 3A and 3B with a counterbalancing portion extending therefrom.

FIGS. 3A and 3B show a second embodiment of a vent restrictor 36' according to the present invention. The vent restrictor 36' rotatably attaches to an air bag housing 18' via a fastener 42. The vent restrictor 36' includes a flange 44, with a tether 38' looping around the flange 44 and connecting at a distal end to a deployment door (not shown). The vent restrictor 36' rotates from a first position, shown in FIG. 3A, to a second position, shown in FIG. 3B, in response to movement of the deployment door, as described with respect to the first embodiment of the invention. In the first position, the vent restrictor 36' substantially covers a vent 34' (shown in FIG. 3B) defined by the housing 18'. In the second position, the vent 34' is substantially open, thus allowing inflation fluid flow therethrough. As shown in FIG. 3B, the flange 44 may be designed such that a tether 38' is released from the vent restrictor 36' upon movement to the second position. FIG. 3C shows a vent restrictor 36" including a flange 44' and a counterbalancing portion 46, with the counterbalancing portion ensuring that rotational movement of the vent restrictor 36" is induced by movement of the deployment door, and not by lateral loads thereto.

FIGS. 3A and 3B also illustrate additional features of the present invention. Particularly, the housing 18' includes a pair of protrusions 48 disposed on either side of the vent restrictor 36'. The protrusions 48 act in concert as a first retention feature for maintaining the first position of the vent restrictor 36'. The housing 18' further includes a travel stop 50, which impedes movement of the vent restrictor 36' therebeyond. Thus, the travel stop 50 defines the second position of the vent restrictor 36'. The housing 18' also includes a post 52, and the vent restrictor 36' includes a node 54, with the post 52 and the node 54 (seen in FIG. 3B) acting in concert as a second retention feature for maintaining the second position of the vent restrictor 36'. One skilled in the art will recognize that many different alternative configurations of the first and second retention features and the travel stop 50 are possible within the scope of the present invention, dependent upon air bag system and vent restrictor design.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. An air bag system housed within a cavity, said air bag system comprising:
    an inflator operable to release inflation fluid;
    an inflatable air bag, said air bag being inflatable upon release of inflation fluid from said inflator;
    an air bag housing substantially surrounding said air bag, said housing defining a vent for venting inflation fluid from said air bag;
    a deployment door at least partially covering said cavity, said deployment door being movable between a closed position and an open position;
    a vent restrictor movable between a first position and a second position, said vent restrictor at least partially blocking said vent to restrict venting of inflation fluid therethrough when in one of said first and second positions, and leaving said vent substantially open to allow inflation fluid flow therethrough when in the other of said first and second positions; and
    a tether extending between said vent restrictor and said deployment door, said tether thereby operatively connecting said vent restrictor to said deployment door such that movement of said deployment door from said closed position to said open position moves said vent restrictor from said first position to said second position.

2. The air bag system of claim 1, wherein at least a portion of said vent restrictor is integral with said deployment door.

3. The air bag system of claim 1, wherein said vent restrictor translates from said first position to said second position.

4. An air bag system housed within a cavity, said air bag system comprising:
    an inflator operable to release inflation fluid;
    an inflatable air bag, said air bag being inflatable upon release of inflation fluid from said inflator;

an air bag housing substantially surrounding said air bag, said housing defining a vent for venting inflation fluid from said air bag;

a deployment door at least partially covering said cavity, said deployment door being movable between a closed position and an open position; and a vent restrictor movable between a first position and a second position, said vent restrictor at least partially blocking said vent to restrict venting of inflation fluid therethrough when in one of said first and second positions, and leaving said vent substantially open to allow inflation fluid flow therethrough when in the other of said first and second positions;

said vent restrictor operatively connected to said deployment door such that movement of said deployment door from said closed position to said open position moves said vent restrictor from said first position to said second position;

wherein said vent restrictor rotates from said first position to said second position.

5. The air bag system of claim 4, further comprising a tether extending between said vent restrictor and said deployment door, said tether thereby operatively connecting said vent restrictor to said deployment door.

6. The air bag system of claim 4, wherein said vent restrictor includes a counterbalancing portion.

7. The air bag system of claim 4, further including a first retention feature to keep said vent restrictor in said first position.

8. The air bag system of claim 4, further including a second retention feature to keep said vent restrictor in said second position.

9. The air bag system of claim 4, further including a travel stop, wherein said vent restrictor is movable from said first position toward said second position until contacting said travel stop.

10. An air bag system housed within a cavity, said air bag system comprising:

an inflator operable to release inflation fluid;

an inflatable air bag, said air bag being inflatable upon release of inflation fluid from said inflator;

an air bag housing substantially surrounding said air bag, said housing defining a vent for venting inflation fluid from said air bag;

a vent restrictor movable between a first position and a second position, said vent restrictor at least partially blocking said vent to restrict venting of inflation fluid therethrough when in one of said first and second positions, and leaving said vent substantially open to allow inflation fluid flow therethrough when in the other of said first and second positions; and a tether extending between said vent restrictor and said air bag, said tether thereby operatively connecting said vent restrictor to said air bag such that inflation of said air bag moves said vent restrictor from said first position to said second position.

11. The air bag system of claim 10, wherein said vent restrictor translates from said first position to said second position.

12. An air bag system housed within a cavity, said air bag system comprising:

an inflator operable to release inflation fluid;

an inflatable air bag, said air bag being inflatable upon release of inflation fluid from said inflator;

an air bag housing substantially surrounding said air bag, said housing defining a vent for venting inflation fluid from said air bag;

a vent restrictor movable between a first position and a second position, said vent restrictor at least partially blocking said vent to restrict venting of inflation fluid therethrough when in one of said first and second positions, and leaving said vent substantially open to allow inflation fluid flow therethrough when in the other of said first and second positions;

said vent restrictor operatively connected to said air bag such that inflation of said air bag moves said vent restrictor from said first position to said second position;

wherein said vent restrictor rotates from said first position to said second position.

13. The air bag system of claim 12, further comprising a tether extending between said vent restrictor and said air bag, said tether thereby operatively connecting said vent restrictor to said air bag.

14. The air bag system of claim 12, wherein said vent restrictor includes a counterbalancing portion.

15. The air bag system of claim 12, further including a first retention feature to keep said vent restrictor in said first position.

16. The air bag system of claim 12, further including a second retention feature to keep said vent restrictor in said second position.

17. The air bag system of claim 12, further including a travel stop, wherein said vent restrictor is movable from said first position toward said second position until contacting said travel stop.

18. An air bag system housed within a cavity, said air bag system comprising:

an inflator operable to release inflation fluid;

an inflatable air bag, said air bag being inflatable upon release of inflation fluid from said inflator;

an air bag housing substantially surrounding said air bag, said housing defining a vent for venting inflation fluid from said air bag;

a deployment door at least partially covering said cavity, said deployment door being movable between a closed position and an open position;

a vent restrictor movable between a first position and a second position, said vent restrictor at least partially blocking said vent to restrict venting of inflation fluid therethrough when in one of said first and second positions, and leaving said vent substantially open to allow inflation fluid flow therethrough when in the other of said first and second positions; and a tether operatively connecting said vent restrictor with one of said deployment door and said air bag, said tether pulling said vent restrictor from said first position to said second position during inflation of said air bag.

19. The air bag system of claim 18, wherein said tether operatively connects said vent restrictor with said air bag, and wherein inflation of said air bag tensions said tether, thereby causing said tether to pull said vent restrictor from said first position to said second position.

20. The air bag system of claim 18, wherein said tether operatively connects said vent restrictor with said deployment door, and wherein movement of said deployment door from said closed position to said open position tensions said tether, thereby causing said tether to pull said vent restrictor from said first position to said second position.

* * * * *